Dec. 31, 1929.  F. ACKERMAN  1,741,598
PORTABLE APPARATUS
Filed Feb. 18, 1924   3 Sheets-Sheet 1
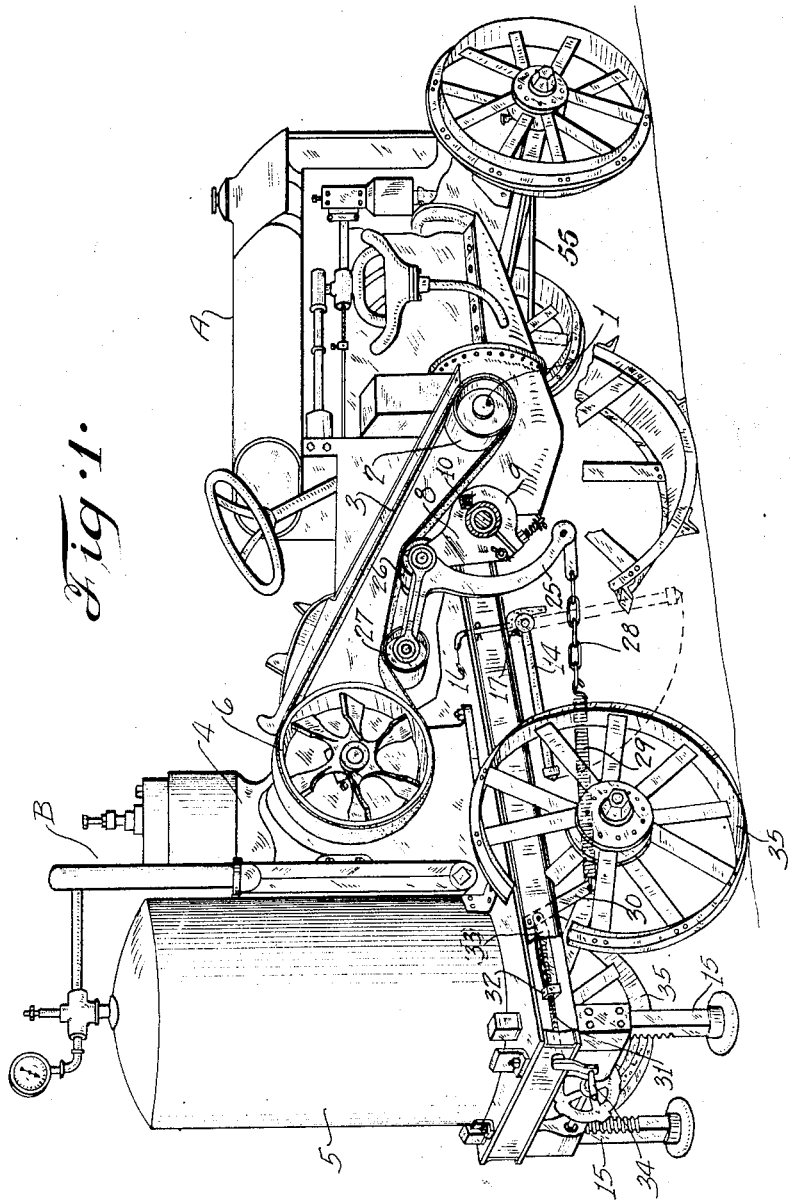
INVENTOR
Frank Ackerman.
BY Bakewell Church
ATTORNEYS

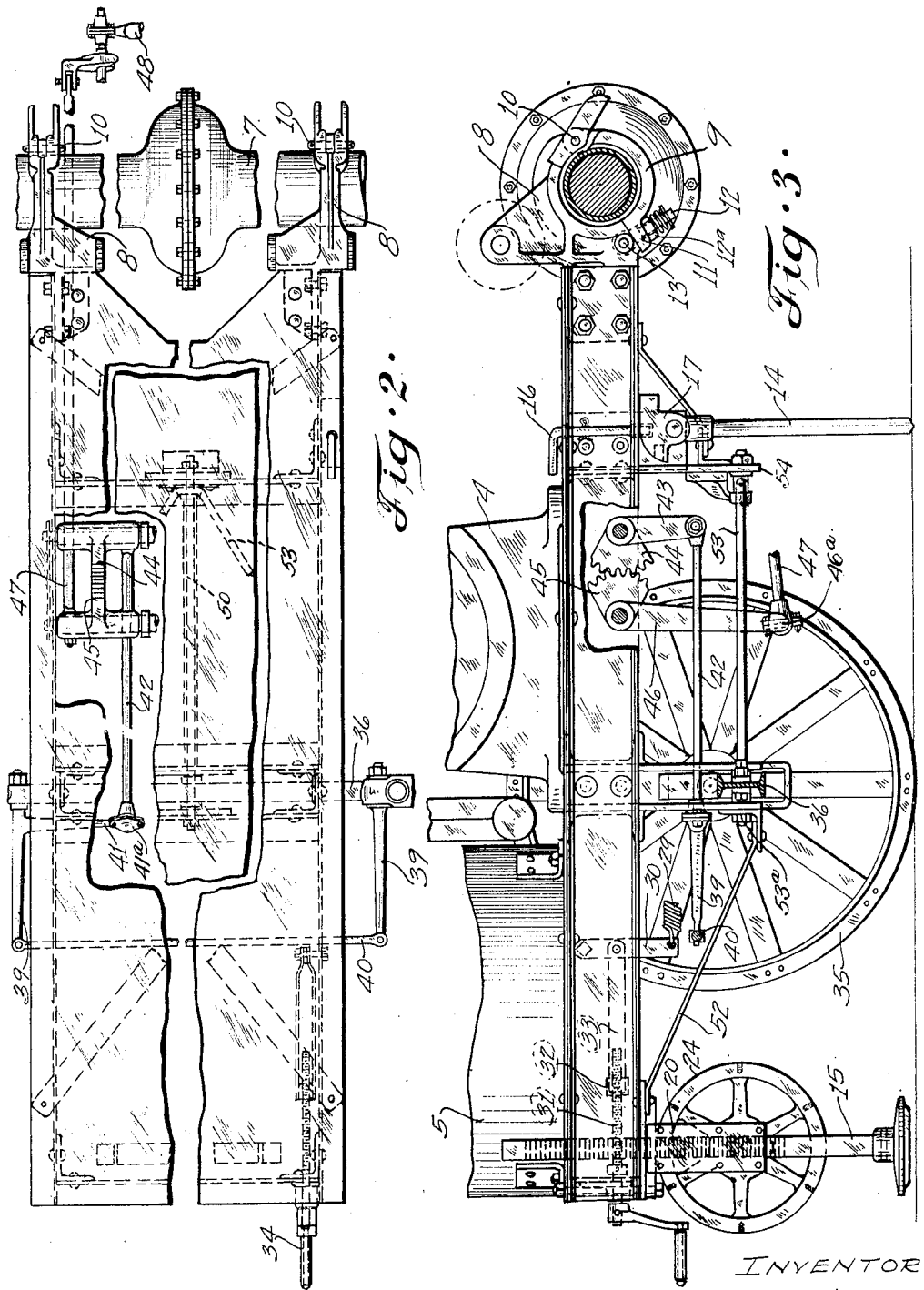

Dec. 31, 1929.   F. ACKERMAN   1,741,598
PORTABLE APPARATUS
Filed Feb. 18, 1924   3 Sheets-Sheet 3

INVENTOR
Frank Ackerman.
BY Bakewell & Church
ATTORNEYS

Patented Dec. 31, 1929

1,741,598

UNITED STATES PATENT OFFICE

FRANK ACKERMAN, OF ST. LOUIS, MISSOURI, ASSIGNOR TO CURTIS MANUFACTURING COMPANY, OF WELLSTON, MISSOURI, A CORPORATION OF MISSOURI

PORTABLE APPARATUS

Application filed February 18, 1924. Serial No. 693,616.

This invention relates to portable apparatus of the kind that comprise a tractor equipped with a belt pulley, and a trailer connected to said tractor and equipped with a driven machine that is adapted to be operated by a belt which passes around the belt pulley of the tractor.

One object of my present invention is to provide an inexpensive and efficient portable apparatus of the kind mentioned in which the tractor and trailer are combined in such a way that the tractor can be easily disconnected from the trailer and used for any of the various purposes for which tractors are designed, and constructed in such a manner that the belt pulleys on the tractor and on the machine on the trailer will be maintained in perfect alignment when said machine is in operation.

Another object is to provide an apparatus of the kind referred to which is of such design that there is no liability of the supporting structure for the machine carried by the trailer weaving or vibrating in such a way when said machine is in operation as to cause an uneven strain on the driving belt.

Another object is to provide a portable apparatus of the general type mentioned that has the following desirable characteristics: A quick acting means for enabling the trailer to be connected to and disconnected from the tractor constructed in such a manner that the trailer is securely held against sidewise swaying relatively to the tractor when the apparatus is in motion; a means for preventing the driving belt of the machine on the trailer from being subjected to injurious strains when the apparatus is traveling over a rough road, constructed in such a manner that it can be adjusted easily to maintain the proper tension on the driving belt when the machine is in operation; and a means for raising the wheel or wheels of the trailer from the ground preparatory to setting the machine on the trailer in operation, constructed in such a manner that the platform on which the machine rests will have an even bearing, even though the ground is rough and uneven, and will be maintained in such a position that the driving belt will run true.

And still another object of my invention is to provide a portable apparatus composed of a tractor, a trailer, a coupling means for connecting the trailer to the tractor constructed in such a way that the chassis of the trailer is free to rock vertically, but is held against sidewise swaying, and two supporting wheels for the trailer carried by pivotally mounted knuckles that are combined with the knuckles of the front wheels of the tractor in such a way that the wheels of the trailer will turn oppositely to the front wheels of the tractor when the apparatus is in motion, and thus cause the trailer to track accurately. Other objects and desirable features of my invention will be hereinafter pointed out.

I have herein illustrated my invention embodied in a portable apparatus that comprises a driven machine consisting of an air compressor mounted on a trailer that is detachably connected to a tractor, but I wish it to be understood that it is immaterial, so far as my invention is concerned, what type or kind of driven machine is mounted on the trailer.

Figure 1 of the drawings is a perspective view of an apparatus constructed in accordance with my invention.

Figure 2 is an enlarged top plan view of a portion of the trailer of the air compressor unit, partly broken away, so as to show the means that is used for causing the wheels of the trailer to turn oppositely to the front wheels of the tractor.

Figure 3 is a side elevational view of the air compressor unit.

Figure 4:
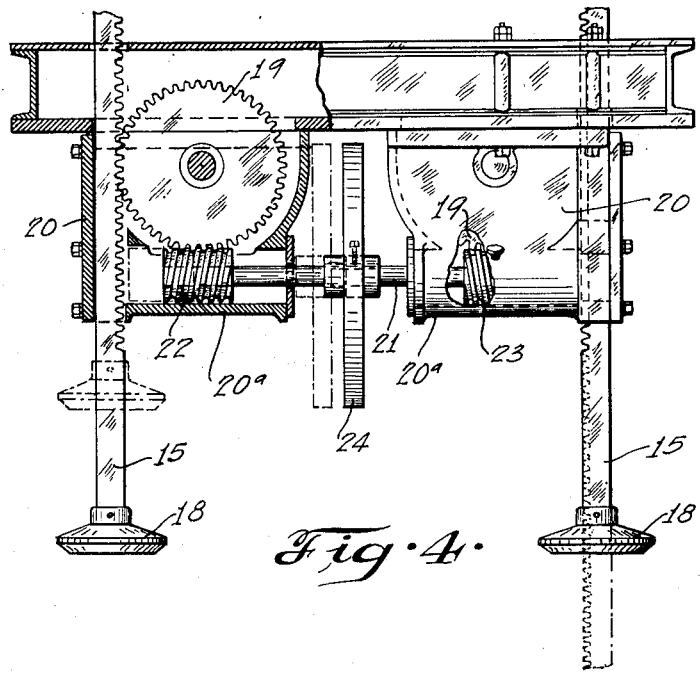
Figure 4 is a rear elevational view of a portion of the chassis of the trailer, partly broken away, so as to illustrate the construction of the differential jack that is used for raising the wheels of the trailer from the ground.

Referring to Figure 1 of the drawings, which illustrates the preferred form of my invention, A designates as an entirety a tractor, and B designates as an entirety a unit that is detachably connected to said tractor. In the form of my invention herein illustrated the unit A consists of a conventional "Fordson" tractor, but any suitable type or kind of tractor may be used, so long as it is equipped with a shaft 1 for imparting rotary movement to a pulley 2 that can be used for actuating a belt 3 which is used to drive a machine that forms part of the unit B. The unit B may be of various forms, but I have herein illustrated it as comprising a trailer provided with a platform, a compressor 4 and an air storage tank 5 on said platform, a pulley 6 on the shaft of the compressor, around which the driving belt 3 extends, and two wheels or a single wheel of the castor type for supporting the platform of the trailer.

The compressor unit is connected with the tractor by a coupling means which can be manipulated easily to disconnect the compressor unit from the tractor, thereby enabling the tractor to be used for any of the various purposes for which tractors are designed, and said compressor unit is equipped with means for sustaining the platform of the trailer in a horizontal or substantially horizontal position when the compressor unit is disconnected from the tractor. In the apparatus herein shown the chassis of the trailer of the compressor unit is provided at its front end with two spaced coupling devices that are adapted to co-operate with the rear axle housing 7 of the tractor, each of said coupling devices consisting of a stationary member 8 that is curved so as to partially surround said axle housing, and a pivotally mounted, curved member 9 that co-operates with the stationary member 8 to form a yoke which completely surrounds the rear axle housing 7 of the tractor. Said members 8 and 9 are pivotally connected together at 10, as shown in Figure 3, and the member 9 is provided at its free end with a bifurcated portion 11 which receives a bolt 12 pivotally connected at 13 to the stationary member 8. When it is desired to disconnect the air compressor unit from the tractor the nuts 12ª on the bolts 12 of the coupling devices can be loosened so as to permit said bolts to be swung in a direction to disengage the nuts on same from the bifurcated portions 11 on the pivotally mounted members 9 of the coupling devices, after which said members 9 can be swung forwardly so as to enable the coupling devices to be swung upwardly out of engagement with the rear axle housing 7 of the tractor. Coupling devices of the kind referred to form a very efficient means for connecting a trailer to a "Fordson" tractor, because the rear axle housing of the conventional "Fordson" tractor is provided with two cylindrical portions that the coupling devices on the trailer surround, which cylindrical portions are spaced far enough apart to eliminate the possibility of the trailer swaying or moving sidewise relatively to the tractor when the apparatus is in motion. While I prefer to equip the chassis of the trailer with coupling devices arranged adjacent the front ends of the side members of the frame of the trailer and designed so that they will surround the rear axle housing of the tractor, I do not wish it to be understood that my invention is limited to an apparatus in which the air compressor unit is connected to the tractor in this particular manner, for various other means could be used for connecting the trailer of the air compressor unit with the tractor, so long as said units are combined in such a way that the frame of the trailer is free to rock vertically, but is securely held against sidewise swaying when the apparatus is in motion.

As shown in Figure 3, the trailer of the air compressor unit is provided adjacent its front end with two supporting legs 14 and provided adjacent its rear end with two jacks 15. The supporting legs 14 are pivotally mounted so that they can be swung upwardly into a substantially horizontal position, as shown in full lines in Figure 1, when the trailer is connected with the tractor, and swung downwardly into engagement with the ground, as shown in broken lines in Figure 1 and in full lines in Figure 3, when the trailer is disconnected from the tractor, thereby serving as struts that sustain the front end of the frame of the trailer and maintain it in a substantially horizontal position. Locking devices consisting of manually-operable plungers 16 are provided for holding the supporting legs 14 in their operative and inoperative positions, said plungers 16 being reciprocatingly mounted in guides on the side members of the frame of the trailer, and the legs 14 being provided at their upper ends with head pieces 17 that have holes or recesses arranged so as to receive the plungers 16 in the two positions of said legs.

The jacks at the rear end of the trailer are used to raise the wheel or wheels of the trailer from the ground and sustain the rear end of the trailer frame when the compressor is in operation. Accordingly, when said jacks are in use the platform on which the compressor is mounted will be supported so firmly that it will not weave or vibrate, as might occur if the wheels of the trailer were used to support the rear end of the trailer frame when the compressor is in operation. Said jacks consists of two vertically-disposed rack bars 15 reciprocatingly mounted in the frame of the trailer, and an operating mechanism combined with said rack bars in such a way that said rack bars can be moved different distances to position ground engaging members 18 thereon in engagement with the ground and thereafter actuated to raise the frame of the trailer. In the form of my invention herein illustrated the operating mechanism just referred to consists of two rotatable pinions 19 carried by an element 20 arranged on the underside of the frame of the trailer, a horizontally-disposed operating shaft 21 arranged at right angles to the rack bars 15 and provided with a right hand worm 22 that meshes with one of the pinions 19 and a left hand worm 23 that meshes with the other pinion 19, and a hand wheel 24 connected to said shaft. The element 20 is provided with two horizontally-disposed bearings 20ª arranged in longitudinal alignment with each other that support the worms 22 and 23, and the operating shaft 21 is mounted in such a way that it can be revolved forwardly or rearwardly and also moved endwise to the right and to the left, looking at Figure 4. When the hand wheel 24 is arranged in its neutral position, namely, midway between the bearings 20ª, as shown in full lines in Figure 4, the worms 22 and 23 will co-operate with the rack bars 15 to hold the ground-engaging members 18 at the same level or in the same horizontal plane. At such times, namely, when the hand wheel 24 is in its central position, rotary movement of the operating shaft 21 in one direction causes the pinions 19 to revolve in opposite directions and travel upwardly over the rack bars 15, thus causing the frame of the trailer to move upwardly, and when said operating shaft 21 is revolved in the opposite direction, the pinions 19 rotate in unison and travel downwardly over the rack bars 15, thus causing the frame of the trailer to move downwardly. If the ground on which the jacks are to be supported is uneven or provided with high and low points, the operating shaft 21 moves endwise, for example, to the left, looking at Figure 4, during the operation of lowering the jacks, thus causing the worms 22 and 23 to act as racks which rotate the pinions 19 in the same direction. This movement of the worms 22 and 23 causes the left hand rack bar 15 to move upwardly and the right hand rack bar 15 to move downwardly, as shown in broken lines in Figure 4, and results in a change in the elevation of the ground-engaging members 18. Assuming that the members 18 are positioned above uneven ground and that it is desired to lower said members, the operator turns the wheel 24 in a direction to move the racks 15 downwardly. When one of the members 18 comes in contact with a high point on the ground said member will stop, but the continued rotary movement of the wheel 24 causes the shaft 21 with its attached worms to move endwise, whereupon the other member 18 will continue to move downwardly until it is stopped by the ground. After both of the members 18 have engaged the ground the continued rotary movement of the wheel 24 causes both of the racks 15 to co-operate with both of the pinions 19 to exert an equal or uniform upward force on the load supported by the jacks. A mechanism of the kind above described forms a very efficient means for raising the supporting wheel or wheels of a trailer from the ground, as it insures the frame of the trailer being supported evenly, even when the members 18 of the jack rest on high and low portions of the ground, due, of course, to the fact that the ground-engaging members 18 will move different distances until they are stopped by the ground during the operation of lowering said members. In an apparatus of the kind to which my invention relates it is very essential to have the frame of the trailer supported in such a way when the compressor is in operation that the supporting platform of the compressor will be maintained in such a way that it will be prevented from rocking or weaving, due to unequal bearing of the supporting structure that sustains said platform. It is also highly important that the means which is used to lift the wheel or wheels of the trailer from the ground when the compressor is to be set in operation be of such a design that it will operate with equal efficiency on smooth ground and rough ground. The differential jack above described with which the trailer of my apparatus is equipped has the above-mentioned desirable characteristics, for the two spaced ground-engaging members 18 automatically assume different elevations, thus causing them to bear squarely and evenly on rough or uneven ground, and after said members have engaged the ground, the rotary movement of the operating shaft 21 either to raise or to lower the frame of the trailer will cause the load of the trailer to be distributed evenly on the two ground-engaging members 18 at the lower ends of the rack bars 15. While I have stated that the operating shaft 21 shifts to the left during the operation of lowering the ground-engaging members 18, it will, of course, be understood that said operating shaft shifts to the right, during the operation of lowering the members 18, in case the surface of the ground on which the right hand member 18 is to bear is higher than the surface of the ground on which the left hand member 18 is to bear. Due to the fact that the means which rotates the pinions 19 to raise or to lower the frame of the trailer consists of a right hand worm and a left hand worm that mesh with said pinions, said pinions will be locked securely and held against rotation as soon as the rotary movement of the operating shaft 21 ceases during the operation of raising or lowering the platform of the trailer.

In order that the driving belt 3 of the compressor may be maintained at the proper tension when the compressor is in operation, the air compressor unit B is equipped with an adjustable belt tightening device, and in order that the driving belt will not be subjected to injurious strains when the apparatus is traveling over a rough or uneven road, said belt tightening device is constructed so that the belt engaging element of same can yield, and thus reduce the strain on the belt when the wheels of the trailer strike an obstruction or are subjected to a shock when the apparatus is in motion. Various kinds of belt tightening devices may be used without departing from the spirit of my invention, but I prefer to equip the air compressor unit with a belt tightening device that comprises a rockable member 25, two belt-engaging pulleys on said rockable member, a manually-operable adjusting means for moving said member 25 so as to vary the tension of the belt, and a spring combined with said adjusting means in such a manner that the shocks and jars to which the apparatus is subjected when it is in motion will not cause the pulleys on the member 25 to exert strains on the belt sufficient to break the belt. In the form of my invention herein illustrated the rockable member 25 is pivotally mounted on the stationary member 8 of one of the coupling devices previously described and said member 25 is provided with two pulleys 26 and 27 that act on the underside of the belt 3, the pulley 26 being arranged in concentric relation with the axis of movement of the member 25 and the pulley 27 being arranged at a point some distance from the axis of movement of the member 25. As shown in Figure 1, the member 25 is substantially elbow-shaped in general outline and the pulley 27 is rotatably mounted in the free end of the horizontal arm of said member, thereby causing the pulley 27 to move upwardly so as to tighten the belt 3 when the depending arm of the member 25 is moved rearwardly. The adjusting means previously referred to is herein illustrated as consisting of the depending arm of the bell crank-shaped member 25 which is connected by a chain 28 and a coiled spring 29 to a lever 30 on the frame of the trailer that is combined with an actuating device consisting of a horizontally-disposed, screw-threaded shaft 31 that passes through a nut 32 equipped with a clevice 33 which is pivotally connected to the lever 30. The shaft 31 is rotatably mounted in the frame of the trailer and is provided at its outer end with an operating handle 34 that is adapted to be manipulated so as to move the nut 32 longitudinally in one direction to cause the tension on the belt to be increased, or longitudinally in the opposite direction so as to cause the member 25 to swing in a direction to reduce the tension on the driving belt of the compressor. When the apparatus is in motion the spring 29 will stretch in case the wheels of the trailer are subjected to a sudden shock or jar, thereby preventing the pulley 27 on the member 25 from exerting an injurious strain on the driving belt 3, and when the compressor is in operation the driving belt of the compressor can be maintained at the proper tension by manipulating the handle 34, so as to increase or diminish pressure of the pulley 27 on the driving belt 3. It will thus be seen that in my improved apparatus there is little liability of trouble developing, due to improper tension of the driving belt of the compressor, to breaking of said belt when the apparatus is in motion, or disengagement of said belt from the belt pulleys when the compressor is in operation, because the compressor unit is coupled with a tractor unit in such a way that the belt pulleys of said units are maintained in parallel relation and in longitudinal alignment, and the belt is maintained at the proper tension by an easily adjustable belt tightening device which is so constructed that it can yield sufficiently to prevent the belt from being subjected to an injurious strain when the apparatus is traveling over a rough road.

Figure 5:
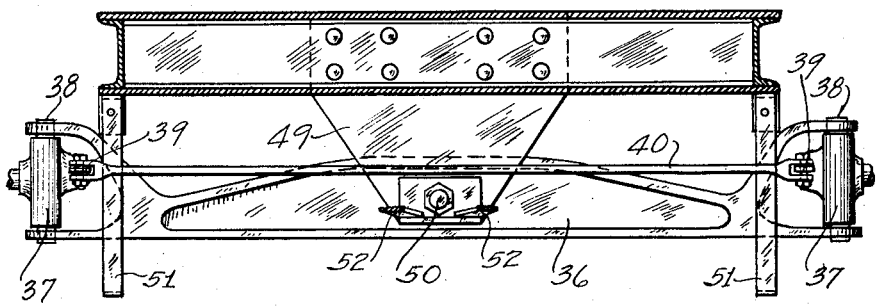
Figure 5 is a transverse sectional view of a portion of the chassis of the trailer, illustrating the construction of the axle of the trailer.

In apparatus of the kind that comprise a tractor or other suitable propelling means and a two-wheeled trailer coupled to said propelling means, it is essential that said units be connected together in such a way that the wheels of the trailer will track properly. To this end I propose to equip the trailer with two wheels 35, connect the frame or chassis of the trailer to the propelling means in such a way that the trailer is securely held against sidewise swaying, and mount the wheels of the trailer on pivotally-mounted knuckles that are combined with the steering mechanism of the tractor in such a way that the wheels of the trailer will turn oppositely to the front wheels of the trailer when the front wheels of the tractor are turned to the right or to the left to guide the apparatus. As shown in Figure 5, the trailer of the apparatus herein illustrated is equipped with an axle 36 and the wheels 35 of the trailer are mounted on knuckles 37 that turn or oscillate on vertically-disposed spindles 38 carried by bifurcated portions at the ends of the axle 36. The knuckles 37 are provided with horizontally-disposed arms 39 that are connected together by a cross link or drag link 40, as shown in Figure 2, and one of said knuckles is provided with an arm 41 that is joined by a ball and socket joint 41ª to a rod 42 whose opposite end is pivotally connected to an arm 43 on a segmental rack 44 that rocks on a horizontal pivot on the frame of the trailer, as shown in Figure 3. Said segmental rack 44 meshes with a similar rack 45 mounted on a horizontal pivot on the frame of the trailer, and said rack 45 is provided with an arm 46 that is connected at its lower end by means of a ball and socket joint 46ª to a link 47 whose front end is joined to the steering mechanism of the front wheels of the tractor, said steering mechanism being designated as an entirety by the reference character 48 in Figure 2. When said steering mechanism 48 is manipulated to turn the front wheels of the tractor to the right, the wheels 35 of the trailer will turn in the opposite direction, and when said steering mechanism is manipulated to turn the front wheels of the tractor to the left, the wheels of the tractor will swing in the opposite direction, thereby insuring the wheels of the trailer tracking properly when the apparatus is traveling around a curve. I am aware of the fact that it is old to connect the wheels of a trailer with a tractor or other propelling means in such a way that the wheels of the trailer will turn oppositely to the front wheels of the tractor when the guiding mechanism of the tractor is manipulated to change the direction of the path of travel of the tractor, but I believe that it is new to couple a trailer to a tractor by a means which permits the chassis of the trailer to rock vertically, but holds it securely against sidewise swaying and provide the trailer with two supporting wheels mounted on knuckles that are connected with the front wheels of the tractor or with the steering mechanism of the tractor so that the wheels of the trailer will swing oppositely to the front wheels of the tractor when said front wheels are turned to the right or to the left.

Instead of rigidly connecting the axle 36 of the trailer to the supporting frame of the trailer on which the compressor is mounted, I provide the frame of the trailer with a depending axle support 49 to which the axle 36 is pivotally connected by a horizontally-disposed bolt, pin or shaft 50 that extends longitudinally of the trailer, thereby permitting the axle of the trailer to rock when the apparatus is in motion without exerting an injurious strain on the frame of the trailer which is connected rigidly at two spaced points to the rear axle housing of the tractor, as previously described. The frame of the trailer is provided with depending guides 51 that embrace the axle 36 and maintain it in a position at right angles to the longitudinal axis of the trailer, and suitable braces 52 are connected to the frame of the trailer and to the depending axle support 49 so as to absorb the shocks and strains on said axle support 49 when the apparatus is in operation. I also prefer to attach a substantially V-shaped brace 53 to the axle 36 and to a depending bracket 54 on the frame of the trailer, said brace 53 being of the same kind as the V-shaped brace 55 used in connection with the front axle of the conventional Fordson tractor, but arranged reversely. In other words, the brace 53 leads forwardly from the axle 36 of the trailer, as shown in Figure 3, and the rear ends of the side legs of said brace are rigidly connected to the axle 36 by nuts 53ª or in any other suitable manner, the front end or apex of said brace being pivotally connected to the bracket 54 preferably by the longitudinal, horizontally-disposed shaft 50, previously referred to, that is used to pivotally connect the axle 36 to the axle support 49.

As previously stated, it is immaterial, so far as certain features of my invention are concerned, whether the trailer is equipped with a single wheel or with two wheels, but in view of the fact that I have herein shown my invention embodied in an apparatus that comprises a two-wheeled trailer, I have referred in the claims to the "wheels" of the trailer being held out of engagement with the ground when the machine on the trailer is in operation. I wish it to be understood, however, that the plural term "wheels" is not used as a limitation, as my invention contemplates the use of a trailer equipped with a single supporting wheel.

Having thus described my invention, what I claim as new and desire to secure by Letters Patent is:

1. A portable apparatus, comprising a tractor, a trailer detachably connected to said tractor, two vertically-disposed racks reciprocatingly mounted in the rear end portion of the trailer frame and each equipped with a ground-engaging member, rotatable pinions that mesh with said racks, and a horizontally-disposed operating shaft provided with a right worm that meshes with one of said pinions and a left worm that meshes with the other pinion, said operating shaft being adapted to be moved endwise so as to cause the worms thereon to function as racks which rotate said pinions in the same direction and thus cause said racks to move oppositely so as to change the elevation of the ground-engaging members connected to same.

2. The combination with a tractor chassis, of a trailer chassis in rear of the tractor chassis, means for connecting said chasses including arms extending frontwardly of the trailer on the opposite sides of its chassis to prevent a relative angular displacement between the chasses and to hold them at a fixed distance apart and including means adapted to permit them to swing relatively in a vertical plane, an axle transversely of the trailer chassis and wheels at the opposite ends of the axle normally adapted to support the trailer chassis at the level of that of the tractor, and bracing means connecting the axle with the trailer chassis to prevent a relative horizontal displacement therebetween.

3. The combination claimed in claim 2, said trailer chassis including a cross bar in alignment with the axle, and means depending from the bar centrally of the axle and pivotally connected therewith to permit of a relative swinging movement between the axle and the trailer in a vertical plane only.

4. In combination with the rear axle housing of a tractor, a trailer, a pair of coupling members rigidly connected with the trailer and provided with annular rings about the axle housing of the tractor, to permit of the trailer being propelled by the tractor and to swing relatively in a vertical plane, a two wheel axle at the rear of the trailer pivotally connected to swing transversely of the trailer, and means on opposite sides of the pivoted connection adapted for adjustment to support the trailer in horizontal alignment with the tractor.

5. The combination claimed in claim 4, including means for steering the trailer wheels, and means to prevent the trailer axle from swinging in the plane of its wheels.

FRANK ACKERMAN.